(12) United States Patent
Harold

(10) Patent No.: US 11,886,463 B2
(45) Date of Patent: *Jan. 30, 2024

(54) DISTRIBUTED LEDGER OBJECT ROUTER USING NESTED TIME SIGNALS

(71) Applicant: GoKnown LLC, Shreveport, LA (US)

(72) Inventor: Michael D. Harold, Shreveport, LA (US)

(73) Assignee: GoKnown LLC, Shreveport, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,901

(22) Filed: Aug. 29, 2022

(65) Prior Publication Data

US 2023/0004578 A1 Jan. 5, 2023

Related U.S. Application Data

(63) Continuation-in-part of application No. 17/537,125, filed on Nov. 29, 2021, now Pat. No. 11,477,022, which is a continuation-in-part of application No. 16/993,038, filed on Aug. 13, 2020, now Pat. No. 11,188,523.

(60) Provisional application No. 62/888,011, filed on Aug. 16, 2019.

(51) Int. Cl.
*G06F 16/27* (2019.01)
*H04L 9/00* (2022.01)
*G06Q 20/40* (2012.01)
*G06Q 20/06* (2012.01)

(52) U.S. Cl.
CPC .......... *G06F 16/275* (2019.01); *G06Q 20/06* (2013.01); *G06Q 20/401* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 10,623,173 B1 | 4/2020 | Geng et al. | |
| 10,884,810 B1* | 1/2021 | Verma | H04L 67/02 |
| 2018/0089641 A1* | 3/2018 | Chan | G06Q 40/06 |
| 2019/0026146 A1 | 1/2019 | Peffers et al. | |
| 2019/0050856 A1* | 2/2019 | Vintila | G06Q 20/3829 |
| 2019/0208422 A1 | 7/2019 | Haleem et al. | |
| 2020/0186607 A1 | 6/2020 | Murphy et al. | |
| 2020/0328886 A1 | 10/2020 | Newton et al. | |

(Continued)

*Primary Examiner* — Eddy Cheung
(74) *Attorney, Agent, or Firm* — St. Onge Steward Johnston & Reens LLC

(57) ABSTRACT

A system, method and apparatus in which a client computer initiates and communicates a distributed ledger transaction, which transaction is labeled with a timestamp. A first hashing algorithm are applied to the transaction data and timestamp data to create a first hash value, and the first hash value is associated with the transaction data. When a second distributed ledger transaction is initiated, a second hashing algorithm is applied to the second transaction data to generate a second hash value, and a third hashing algorithm is applied to the to the first and second hash values to create a third hash value which is associated with the second transaction data. The procedure is implemented with each additional transaction data submission. The transaction data is processed in a first-in-first-out sequence based upon the hash values associated with the transaction data.

10 Claims, 6 Drawing Sheets

(56) References Cited

U.S. PATENT DOCUMENTS

2021/0019429 A1    1/2021  Cooner
2022/0138640 A1*  5/2022  Augustine ............... G06F 21/16
                                                    705/5

\* cited by examiner

DISTRIBUTED LEDGER OBJECT ROUTER USING NESTED TIME SIGNALS

FIELD OF THE INVENTION

The present invention relates generally to methods for electronically receiving and transmitting distributed ledger transactions and messages between and among a multiplicity of computing nodes in a distributed ledger network.

BACKGROUND OF THE INVENTION

In an increasingly globalized economy in which transactions are required to traverse both public and private networks of individuals, corporations, national boundaries and continents at speeds and volumes that continue to increase by orders of magnitude, distributed ledgers and their associated blockchain technologies have emerged as a preferred solution. In 2008, Satoshi Nakamoto published the Bitcoin White Paper which described a decentralized, distributed, peer-to-peer, public network of nodes able to provide secure, anonymous, automated payment services between two parties. On Jan. 3, 2009 the bitcoin network became operational when Satoshi Nakamoto mined the genesis (i.e., first) block of bitcoin. One of the key features of the system was and remains the ability to incentivize operators of the nodes by providing them a means to acquire bitcoin currency by being the first to mine (i.e., process) transactions in groups or "blocks" of transactions. Each group of transactions and each transaction within each block is linked together using a one-way cryptographic function that converts plain text to a unique fixed-length text message called a hash. Since there is no way to reverse the hash process to recover the original text, these hashes are used to immutably link all of the transactions processed by the distributed ledger beginning with the first transaction. Because the hashing process is computationally intensive, block mining normally consists of solving a hashing problem of predetermined complexity in order to receive credit for mining the next block in the chain. The creation of a new block requires the approval of other nodes on the network, each of which has a complete and identical copy of the blockchain/ledger record beginning with the first transaction and continuing to the most recent block. This voting approval process makes it difficult to alter completed transactions without the alteration being discovered by the other nodes, greatly increasing the security of the system and the integrity of its data. The computationally intensive nature of the block mining process results in a slower operation of the system than would be possible without block mining. Since transactions are completed in blocks of multiple transactions and since no new group of transactions can be considered completed until the most recent block is recorded, each block in the ledger is essentially a "tick" of the blockchain clock. This "tick" of the blockchain clock is an implicit yet distinct function, separate and apart in purpose from the operator incentive which is block mining. Since the original bitcoin ledger was implemented in 2009, new distributed ledger and blockchain architectures have proliferated. The majority of distributed ledger implementations to date have continued to provide similar incentives for block mining. From a transaction processing point of view, block mining is a batch process. This has proven a major impediment to increasing the speed and transactional throughput of blockchain technology. What is needed to replace this batch process is a means of processing individual transactions in time order across the network. Such an approach to distributed ledger transaction processing is much faster, provides higher throughput and more closely conforms to standard database processes, especially as they relate to concurrency control as a means of ensuring both transactional and data integrity.

None of the presently known methods of distributed ledger transaction processing, however, are able to provide highly secure and scalable transactions while at the same time providing all of the important key features of the underlying blockchain technology which include immutability, decentralization, consensus, security and automation. Specifically, the prior art fails to demonstrate any system or method in which a client computer initiates and communicates a distributed ledger transaction, smart contract or data, hereinafter referred to collectively as "transaction", to an individual node in a network of distributed ledger nodes or to the network itself, which transaction is labeled with a timestamp which is able to accurately preserve its time order and first-in, first-out (i.e., FIFO) position across all nodes in the network, each of which nodes may also receive and process incoming transactions in like manner. Additionally, the prior art fails to describe a cryptographically linked series of transactions that derive their time order from an algorithmic process associated with an ordered set of values determined by a cryptographic hash generated from the timestamp and the data record received, such that for the distributed ledger can distinguish between different time sequenced transactions that may occur within a millisecond or microsecond scale time period. Furthermore, none of the prior art describes a system, method and apparatus that can be easily integrated with existing, blockchain-based distributed ledger networks as a way to improve the speed, volume and security of their transactions.

In particular, timestamp ordering is currently dependent on a network time signal. Many network service providers provide a network time signal with a time tick of 1 millisecond. In large scale applications with many users, it is possible that hundreds or thousands of transactions may be received in the same 1 millisecond time period. In such case, it may not be possible to time order the hundreds or thousands of transactions if network time is the controlling time signal.

There is, therefore, a present need to provide an improved paradigm for managing distributed ledger transactions that overcomes the aforementioned constraints.

SUMMARY OF THE INVENTION

A system and method in which a client initiates and communicates a distributed ledger transaction to an individual node in a network of distributed ledger nodes or to the network itself, which transaction is first labeled with a timestamp and a cryptographic hash generated from the timestamp and the data record received before it is encrypted using quantum event generated random binary digits and then securely transmitted to the other ledger nodes in the network. This allows the highly secure and time ordered communication of all transactions and transaction-related messages to the system with minimal risk of collision or race conditions.

In contrast to the traditional distributed ledger transaction processing model, the present invention permits the secure and rapid transfer of transactions among multiple distributed ledger nodes in a network. To accomplish this, the present invention combines the time ordering of transactions as they are received in real or near-real time, the secure communications of those transactions between ledger nodes, the minimization of network latencies associated with each transaction and the minimization of server and network operating costs associated with each transaction. The present invention is accordingly designed for use as a hardware and software system, method and apparatus capable of transmitting and receiving high volumes of distributed ledger transactions in an automated, peer-to-peer, replicated and decentralized computing environment. Specifically, the decentralized computing environment has as one of its key features a guarantee of first in, first out FIFO transaction processing that removes the need for traditional block-based transaction processing. This is made possible through the use of a timestamp and a hash which is added to each new incoming transaction at the point at which it enters the network. This operation maintains the time order among all transactions being processed by all ledger nodes in the network. In a 1 Gbps network, this translates to thousands of distributed ledger transactions per second. Higher bandwidth capacity (e.g., 10 Gbps, 100 Gbps, etc.) provides a commensurably higher rate of message transmission. Another feature is the encryption of each transaction message between ledger nodes. A further feature is the ability to use the present invention to create distributed ledger networks that receive data or attributes from blockchains, secure data stores, decentralized exchanges, or immutable, general purpose distributed databases.

In accordance with one embodiment of the invention, a method for processing distributed ledger transactions and a decentralized distributed ledger system include the following features. Initiating a distributed ledger transaction using a client device in electronic communication with a distributed ledger object router by entering input data to generate transaction data (D1), generating timestamp data (T1) for the transaction, the timestamp data (T1) identifying a time when the transaction data was acquired, the timestamp data (T1) being a network time signal, or being obtained or derived from a network time signal, then applying a first hashing algorithm to the timestamp data (T1) and the transaction data (D1) to create a hash value (H1), and associating the hash value (H1) with the transaction data (D1), and optionally, associating the timestamp data (T1) with the transaction data (D1). Initiating a second distributed ledger transaction using the client device or another client device in electronic communication with the distributed ledger object router by entering input data to generate transaction data (D2), and applying a second hashing algorithm to the transaction data (D2) to create a hash value (H2), and applying a third hashing algorithm to the hash value (H1) and the hash value (H2) to create a hash value (H3), and associating one or both of the hash values (H2) and (H3) with the transaction data (D2). Initiating a third distributed ledger transaction using the client device or another client device in electronic communication with the distributed ledger object router by entering input data to generate transaction data (D3); applying a fourth hashing algorithm to the transaction data (D2) to create a hash value (H4); applying a fifth hashing algorithm to the hash value (H3) and the hash value (H4) to create a hash value (H5); and associating one or both of the hash values (H4) and (H5) with the transaction data (D3).

The transaction data (D1), (D2), and (D3) and any associated hash values (H1), (H2), (H3), (H4), and (H5) is encrypted and the encrypted transaction data (D1), (D2), and (D3) and any associated hash values (H1), (H2), (H3), (H4), and (H5) is transmitted to a distributed ledger validator node. The distributed ledger validator node unencrypts the received encrypted transaction data (D1), (D2), and (D3) and any associated hash values (H1), (H2), (H3), (H4), and (H5), and then determines the validity of the transaction data (D1), (D2), (D3). The distributed ledger validator node determination of the validity of the transaction data (D1), (D2), (D3) is transmitted to the distributed ledger object router and to other distributed ledger validator nodes. If the distributed ledger validator nodes obtain a consensus majority threshold to validate the transaction data (D1), (D2), and/or (D3), the validated transaction data is added to an immutable persistent ledger data store. The distributed ledger validator node processes the transaction data independently using a first-in-first-out sequence based upon one or more of the hash values (H1), (H2), (H3), (H4), and (H5)

The foregoing processes are repeated for each additional instance of transaction data until the next tick of the network time signal.

At the next tick of the network time signal, the timestamp data is updated to a new time (T2) and the first hashing algorithm is applied to the new timestamp data (T2) and the new transaction data to create a new hash value which is processed as discussed herein with respect to transaction data (D1), (D2), and (D3) and the associated hash values (H1), (H2), (H3), (H4), and (H5).

It is, accordingly, an object of the present invention to set forth an improved paradigm for distributed ledger transaction processing.

It is another object of the present invention to provide a system, method and apparatus able to maximize the speed and throughput of distributed ledger transactions.

It is a further object of the present invention to provide a system, method and apparatus by which transactions can be securely transmitted using multiple encryption methods that include public keys, private keys and nonces composed wholly or in part of quantum event based random binary digits.

It is a further object of the present invention to provide a system, method and apparatus able to create an edge computing network using 5G wireless communications as a means of placing the routing, logic and messaging components of a distributed ledger network node in close proximity to the client devices originating transactions.

It is a further object of the present invention to enable the creation of a distributed ledger using handheld wireless devices, including smartphones and Internet of Things (IoT) devices, as distributed ledger nodes in a network.

It is a further object of the present invention to provide a system, method and apparatus that is able to transmit transaction-related messages between ledger nodes in a distributed ledger network using the same systems and methods as those used to transmit the original transactions.

BRIEF DESCRIPTION OF THE DRAWINGS

A more complete understanding of the system, method and apparatus of the present invention may be obtained by reference to the following Detailed Description when taken in conjunction with the accompanying Drawings.

DETAILED DESCRIPTION OF THE INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

Figure 1:
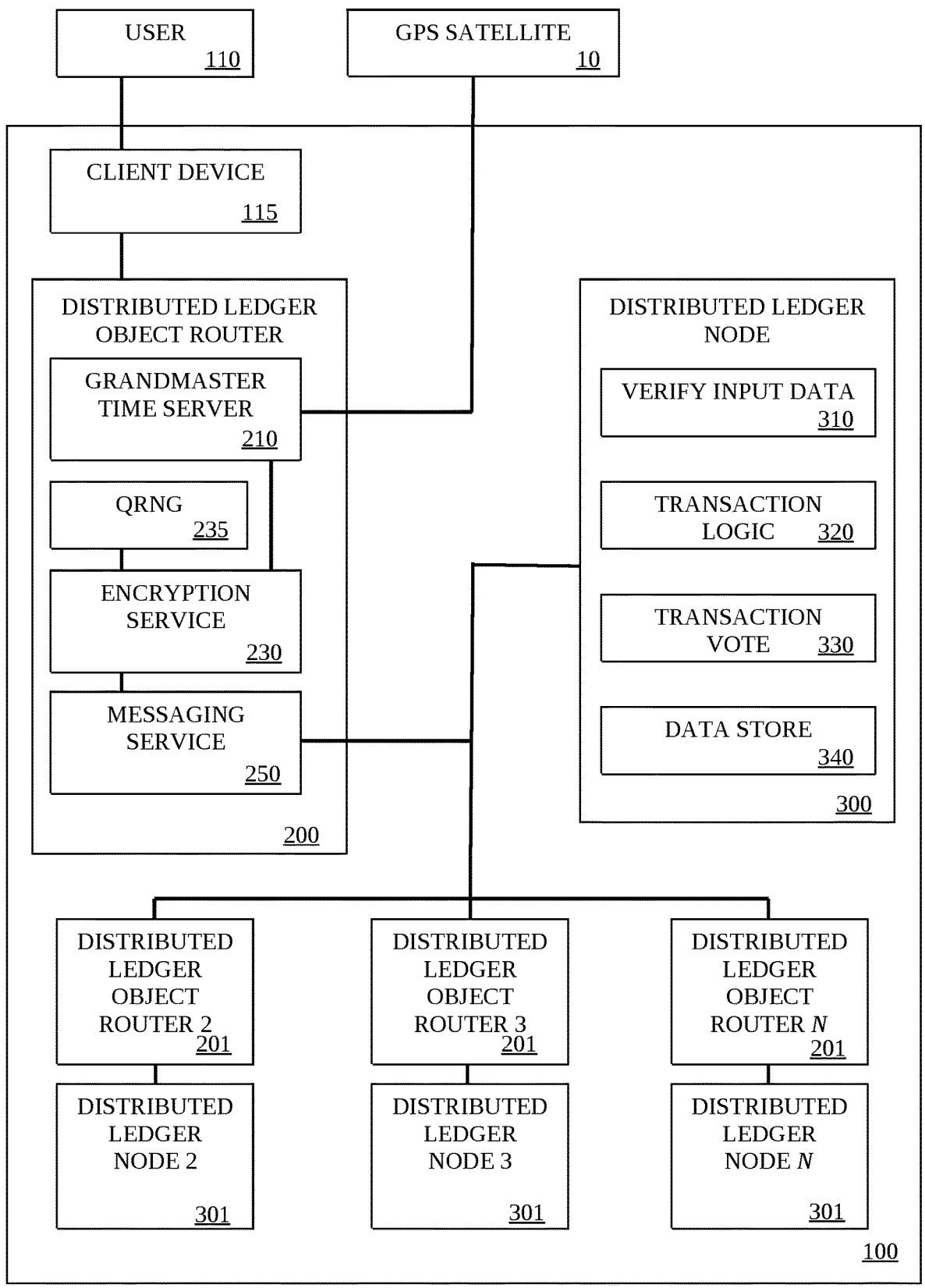
FIG. 1 illustrates the operation of the distributed ledger object router in a distributed ledger network.

With reference now to FIG. 1 of the Drawings, a distributed communications network, generally designated by the reference numeral 100, is shown. In particular, a user 110 of the network 100 uses any of a variety of client devices, including a desktop, laptop, tablet, smartphone, or any other personal computing wireline or wireless computing device, generally designated by the reference number 115, that has as part of its function the ability to initiate and/or participate in multi-party transactions over the network. As shown in the figure, the user 110 uses said client device 115 to initiate a transaction with the distributed ledger object router 200 over the network 100. In the present example, the distributed ledger object router 200 communicates directly with at least one ledger node 300 on the network. The distributed ledger object router 200 first timestamps the transaction. The timestamp is provided by a grandmaster time server 210 able to maintain its accuracy using network signals, including GPS signals received from one or more GPS satellites 10. The term "GPS" as used in the specification and claims in this application is defined as any geospatial positioning system (including the combined use of multiple geospatial positioning systems) such as GNSS, especially the US GPS system and other government sponsored systems such as GLONASS (Russia), Galileo (EU), Beidou (China), as well as commercially launched systems such as Iridium, SpaceX, or other future systems. Each grandmaster time server 210 in each distributed ledger object router 200 operates in the same manner. Some preferable embodiments include a physical GPS receiver locked to Universal Coordinated Time able to receive GPS signals from the GPS satellite(s).

Following the addition of the timestamp to the transaction, the transaction is encrypted by an encryption service 230. Encryption service 230 optionally is based on a physical quantum random number generator or QRNG 235 to create public encryption keys, private encryption keys, nonces and one time key pads in any combination that meet the entropy and other security requirements defined by standards that include, but are not limited to, A1531 PTG.3. In the case of transactions having smaller length transactions, such as payment transactions, a one time key pad is used to encrypt transactions the size of which is equal to or smaller than the Ethernet maximum transmission unit (MTU) size of 1500 bytes. This allows the transaction to be transmitted by the distributed ledger object router 200 in a single network layer transaction.

Following the encryption of the transaction data, a messaging service 250 communicates the transaction data to its associated ledger node 300 and to other distributed ledger object routers 201 on the network 100. As part of their transaction processing workflow, each ledger node 300 receiving the transaction processes the transaction as follows: It first verifies the input data 310. If the verification is successful, the node executes the transaction logic 320 associated with the transaction. Following the execution of the transaction logic, the ledger node 300 votes to either confirm or deny the transaction 330. If the verification of the input data 310 or the execution of the transaction logic 320 does not meet the requirements for a successful vote, the vote result is "NO". Otherwise, the vote result is "YES". The vote result is transmitted to that ledger node's 300 object router 200 where it is communicated via the messaging service 250 to the other ledger nodes in the network. Once the number of "YES" votes reaches the consensus majority vote threshold (ex. 51% or higher) for approval of the transaction, the transaction is added to each ledger node's persistent data store 340 as part of the immutable record of all transactions maintained separately by all ledger nodes in the network.

Figure 2A:
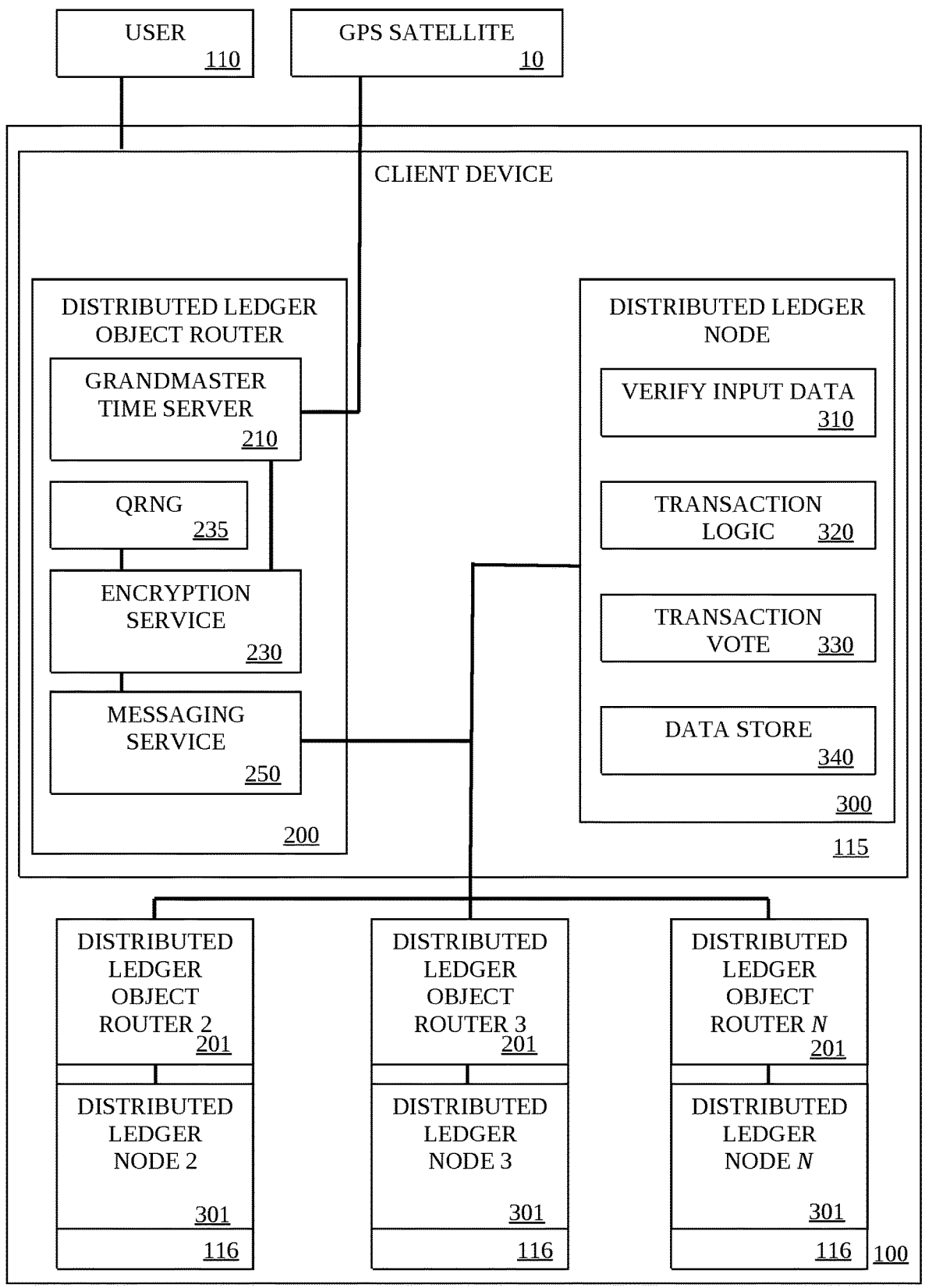
FIG. 2A illustrates the operation of a distributed ledger network comprised of client devices each containing a distributed ledger object router and distributed ledger node.

With reference now to FIG. 2A of the Drawings, a distributed ledger network comprised of client devices of any type, each consisting of a distributed ledger object router and ledger node and each of which operates within a distributed communications network, said network generally designated by the reference numeral 100, is shown.

In particular, a user 110 of the network 100 uses the client device 115 to interoperate with same or dissimilar client devices 116. Said client devices 116 include but are not limited to a desktop, laptop, tablet, smartphone or other handheld device, or any other computing wireline or wireless computing device, that has as part of its function the ability to initiate and/or participate in any type of multi-party transaction over the network. Additionally, client devices 115/116 may take the form of automated and/or embedded devices including but not limited to home automation devices, smart city monitoring and automation devices, manufacturing devices, supply chain monitoring and control devices, virtual reality and augmented reality devices, GIS surveillance and mapping devices such as drones, and ground and air personnel or material transport devices of any type.

Each client device's 115/116 distributed ledger object router 200 communicates directly with its corresponding ledger node 300 which is contained in the same device 115/116. In all cases, the distributed ledger object router 200 first timestamps the transaction using a nanosecond scale time stamp accurate to 100 nanoseconds or less. The grandmaster time server 210 in each distributed ledger object router 200 operates in the same manner. Depending on the size, power and other operating characteristics of each client device 115/116, the grandmaster time server 210 may take the form of a component assembly, chip assembly or single chip. Following the addition of the timestamp to the transaction, the transaction is encrypted by an encryption service 230. Following the encryption of the transaction data, a messaging service 250 communicates the transaction data to its client device's 115 associated ledger node 300 and to other client devices 116 on the network. At the completion of each transaction, the client device's 115/116 ledger node 300 adds the transaction to that ledger node's 300 persistent data store 340 as part of the immutable record of all transactions maintained separately by all ledger nodes in the network.

Figure 2B:
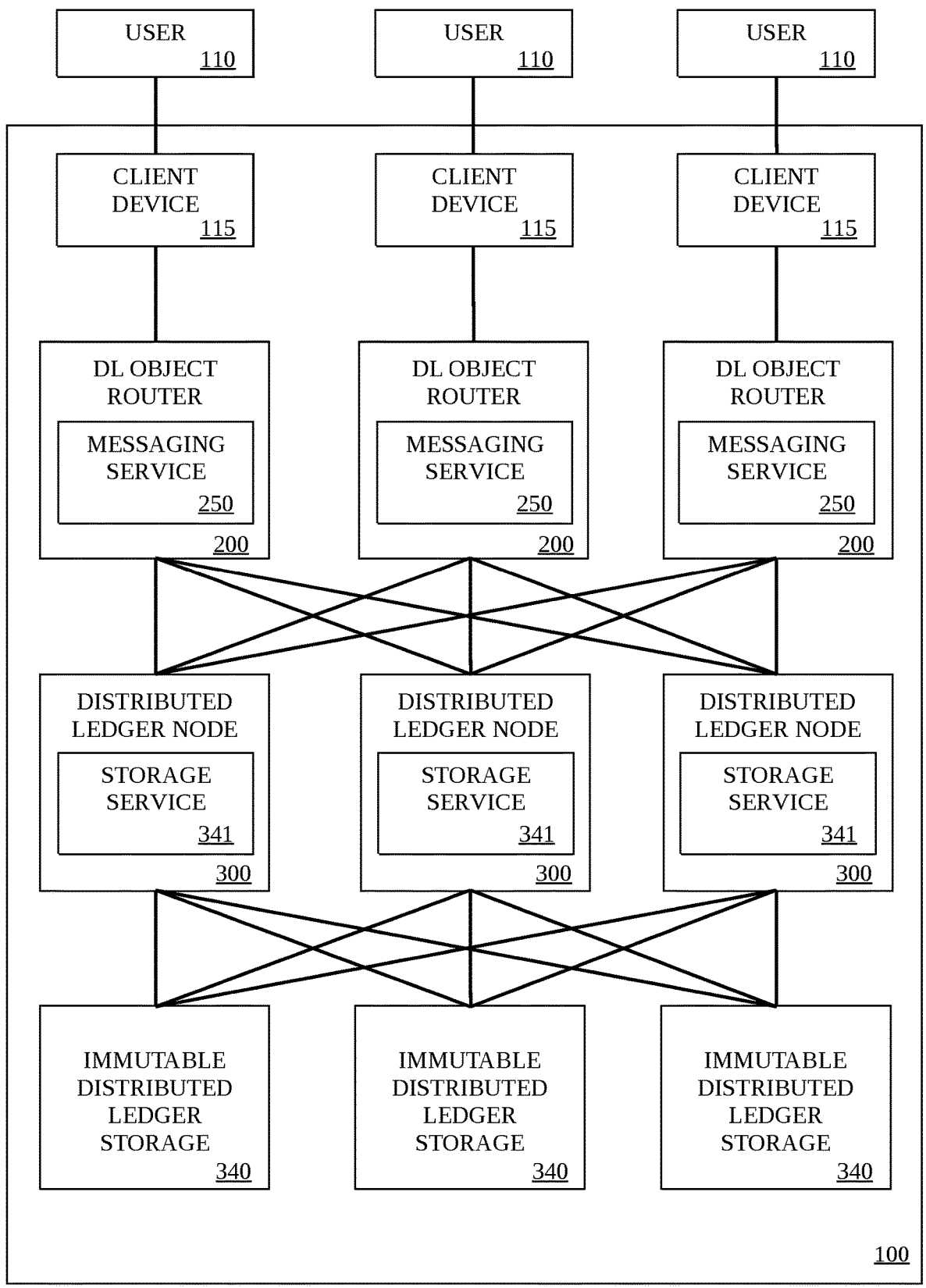
FIG. 2B illustrates the operation of an any-to-any network of distributed ledger object routers, ledger nodes and storage nodes.

With reference now to FIG. 2B of the Drawings, any-to-any communications between distributed ledger object routers, distributed ledger nodes, and distributed ledger storage, is shown. The availability of cloud and intercloud computing, 5G wireless edge clouds and other types of distributed, virtualized computing networks provides an opportunity to enable shortest path routing, load balancing and other methods of maximizing the throughput of distributed ledger transactions using any-to-any communications between system services and components.

In particular, a user 110 of the network 100 uses a client device 115 to initiate a transaction with a distributed ledger object router 200 over the network 100. In the present example, the distributed ledger object router 200 uses its messaging service 250 to transmit the client device 115 transaction to the other ledger nodes 300 on the network. As part of their transaction processing workflow, each ledger node 300 receiving the transaction processes the transaction, and communicates the resulting vote to the other ledger nodes 300 by communicating said result through one of the distributed ledger object routers 200. In order to secure, decentralize and scale the storage of the distributed ledger's immutable transaction record, following completion of the vote and approval of the transaction, each distributed ledger node storage service 341 writes the completed transaction to one or more distributed ledger storage locations 340. Multiple storage locations 340 may be used by each ledger node 300 for purposes of scale, performance and security.

Figure 3:
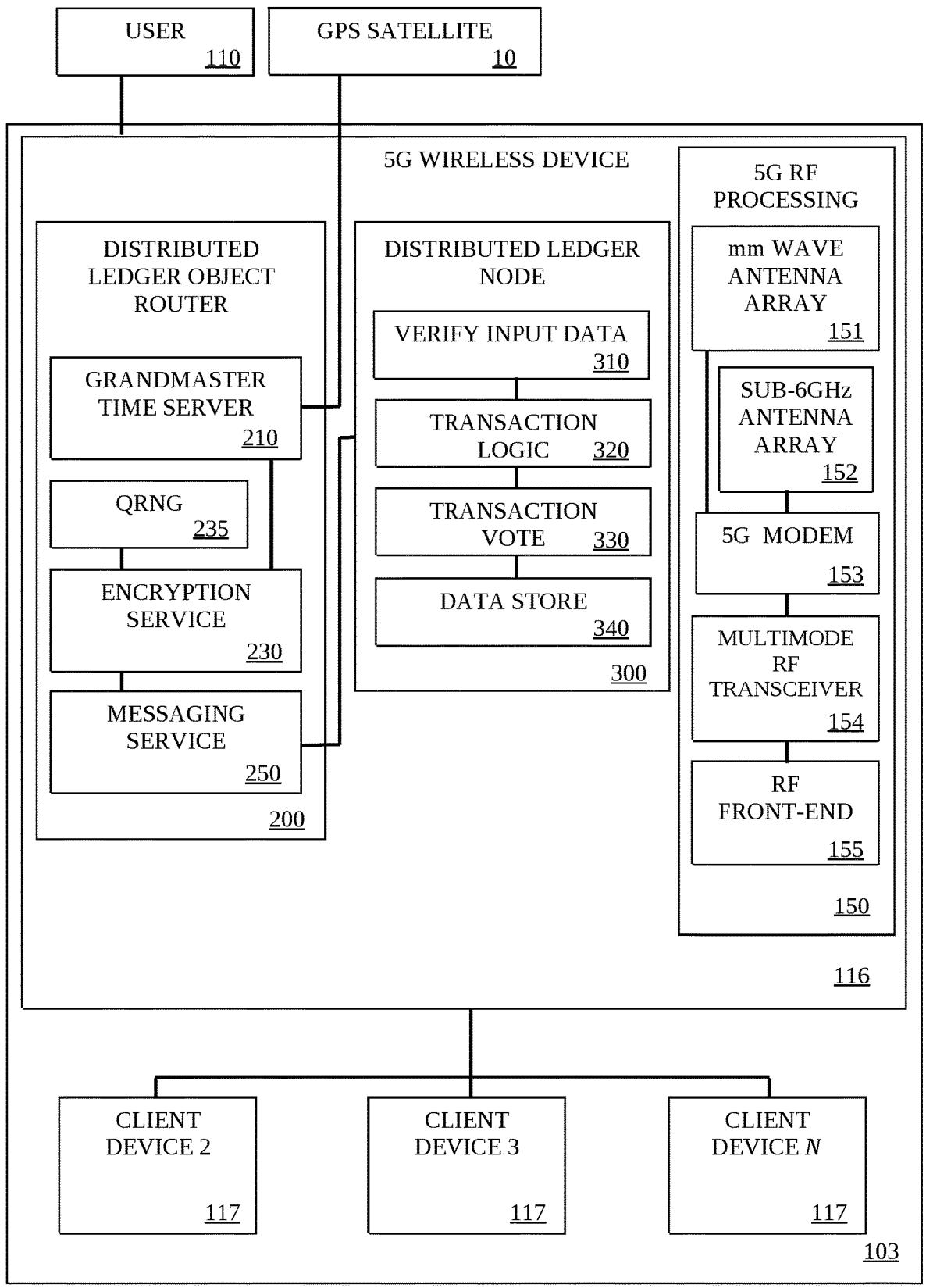
FIG. 3 illustrates the operation of the distributed ledger object router and its associated distributed ledger node using a smartphone or other small form factor wireless device such as an IoT device in a 5G wireless implementation of the distributed ledger network comprised of small form factor 5G wireless devices.

With reference now to FIG. 3 of the Drawings, the operation of a distributed ledger object router and its associated distributed ledger node using a 5G smartphone or other small form factor 5G wireless device, all of which operate within a 5G wireless distributed communications network, said network generally designated by the reference numeral 103, is shown.

In particular, a user 110 of the network 103 uses any one of a variety of 5G enabled devices including smartphones, snapons (i.e, dongles), remote controlled IoT devices, automated and/or embedded IoT devices, and mobile devices of any type, generally designated by the reference numbers 116 and 117, each of which has as part of its function the ability to initiate and/or participate in any type of multi-party transaction over the 5G network 103. As shown in the figure, the user 110 uses said client device 116 to initiate a transaction with the distributed ledger object router 200 over the network 103.

All incoming and outgoing communications to and from any 5G mobile device 116 and 117, is processed by the 5G RF processing block 150 which consists of a mm wave antenna array 151, a sub-6 GHz antenna array 152, a 5G modem 153, a multi-mode RF transceiver 154 and an RF front end module 155 or FEM.

The distributed ledger object router 200 communicates directly with at least one ledger node 300 on the network 103. The distributed ledger object router 200 timestamps the transaction. Following the addition of the timestamp to the transaction, the transaction is encrypted using an encryption service 230. Following the encryption of the transaction data, a messaging service 250 communicates the transaction data to its associated ledger node 300 and to other client devices 117 in the network 103, each of which other client devices 117 contains the same or similar components and services as the client device 116 originating the transaction. The ledger node 300 verifies the input data 310, executes the transaction logic 320, votes to either confirm or deny the transaction 330 and communicates the results to the other client devices 117 in the network 103. Once the vote reaches the consensus majority vote threshold for approval of the transaction, the transaction is added to each ledger node's persistent data store 340 as part of the immutable record of all transactions maintained separately by all ledger nodes in the network.

Figure 4:
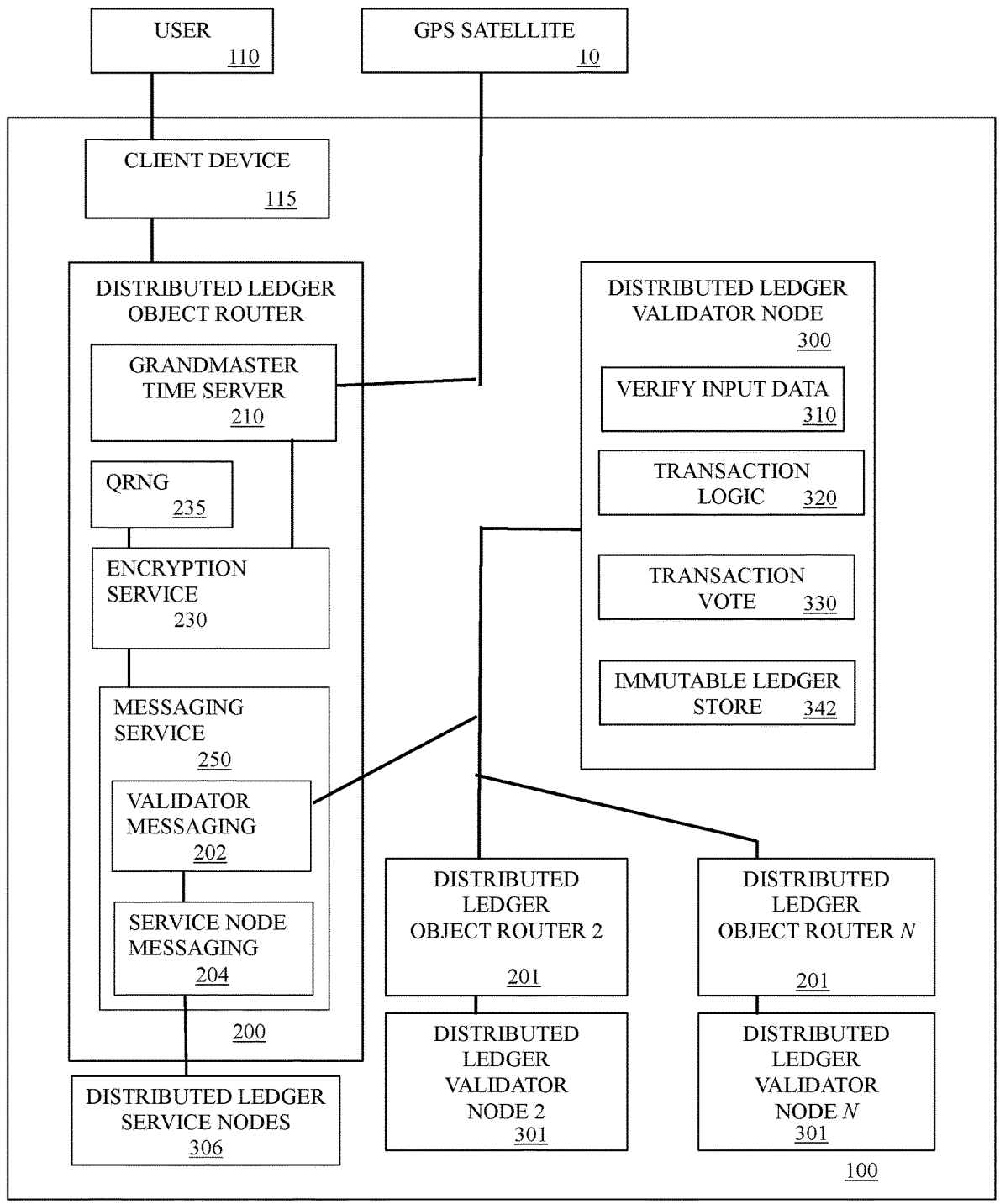
FIG. 4 illustrates the operation of the distributed ledger object router, its associated distributed ledger validator node and one or more service nodes in which validator nodes communicate directly with one another using a validator messaging service and validator nodes communicate with their respective service nodes using a service node messaging service.

With reference now to FIG. 4 of the Drawings, a distributed communications network, generally designated by the reference numeral 100 is shown. In particular, a user 110 of the network 100 uses any of a variety of client devices, including a desktop, laptop, tablet, smartphone, or any other personal computing wireline or wireless computing device or, alternatively, a server computer located on-site, in a data center, in a 5G edge cloud or other private or public cloud, generally designated by the reference number 115, that has as part of its function the ability to initiate and/or participate in multi-party transactions over the network. As shown in the figure, the user 110 uses said client device 115 to initiate a transaction with the distributed ledger object router 200 over the network 100. In the present example, the distributed ledger object router 200 communicates directly with at least one or more distributed ledger validator nodes 302 on the network 100. A distributed ledger validator node 302 is distinct from other types of distributed ledger nodes in that it is the only type of node that is able to participate in consensus voting. A distributed ledger validator node 302 is responsible for verifying, voting on and maintaining an immutable record of all transactions validated by the distributed ledger.

The distributed ledger object router 200 first timestamps the transaction with a timestamp is provided by a grandmaster time server 210. Each grandmaster time server 210 in each distributed ledger object router 200 operates in the same manner.

Following the addition of the timestamp to the transaction, the transaction is encrypted by an encryption service 230. In the case of transactions having smaller length transactions, such as payment transactions, a one time key pad is used to encrypt transactions the size of which is equal to or smaller than the Ethernet maximum transmission unit (MTU) size of 1500 bytes. This allows the transaction to be transmitted by the distributed ledger object router 200 in a single network layer transaction. Following the encryption of the transaction data, a messaging service 250 communicates the transaction data to its associated distributed ledger validator node 302 and to other distributed ledger object routers 201 on the network 100 through a validator messaging service 202. The validator messaging service 202 uses a messaging protocol that communicates directly and independently with the other distributed ledger validator nodes 302 in the distributed ledger network 100. As part of their transaction processing workflow, each distributed ledger validator node 302 receiving the transaction processes the transaction as follows: It first verifies the input data 310. If the verification is successful, the node executes the transaction logic 320 associated with the transaction. Following the execution of the transaction logic, the distributed ledger validator node 300 votes to either confirm or deny the transaction 330. If the verification of the input data 310 or the execution of the transaction logic 320 does not meet the requirements for a successful vote, the vote result is "NO". Otherwise, the vote result is "YES". The vote result is transmitted to that distributed ledger validator node's 302 object router 200 where it is communicated via the validator messaging service 202 to the other distributed ledger validator nodes 304 in the network. Once the number of "YES" votes reaches the consensus majority vote threshold (ex. 51% or higher) for approval of the transaction, the transaction is added to each distributed ledger validator node's immutable ledger store 342 as part of the immutable record of all transactions maintained separately by all distributed ledger validator nodes 302, 304 in the network.

Following the recording of the transaction in the immutable ledger store 342, the resulting transaction record is communicated by the distributed ledger validator node 302 to the distributed ledger object router 200 using the validator messaging service 202. The validator messaging service 202 then turn transmits the completed immutable transaction record to the service node messaging service 204.

The service node messaging service 204 uses a messaging protocol that communicates asynchronously with one or more distributed ledger service nodes 306 using a publish-subscribe messaging protocol. Publish-subscribe messaging, also called pub-sub messaging, is any messaging protocol in which a message is broadcast by a "publisher" to one or more "subscribers" using a uniquely named "topic" or "channel". A publisher may create multiple channels to transmit data to that publisher's subscribers. The publisher does not need to know the machine identities of subscribers. Subscribers do not need to know the machine identity of the publisher. The only information required by a subscriber is the information identifying the channel or topic. Publish-subscribe messaging allows events, transactions and other messages to be securely communicated to many subscribers on a network in real or near real-time at scale. It also guarantees receipt of the published messages by all subscribers to the channel or topic. Subscribers to the topic may perform different functions with the received messages. This type of communication has a broad range of applications including supply chain management, streaming analytics, data pipelining and event-driven machine learning.

Figure 5:
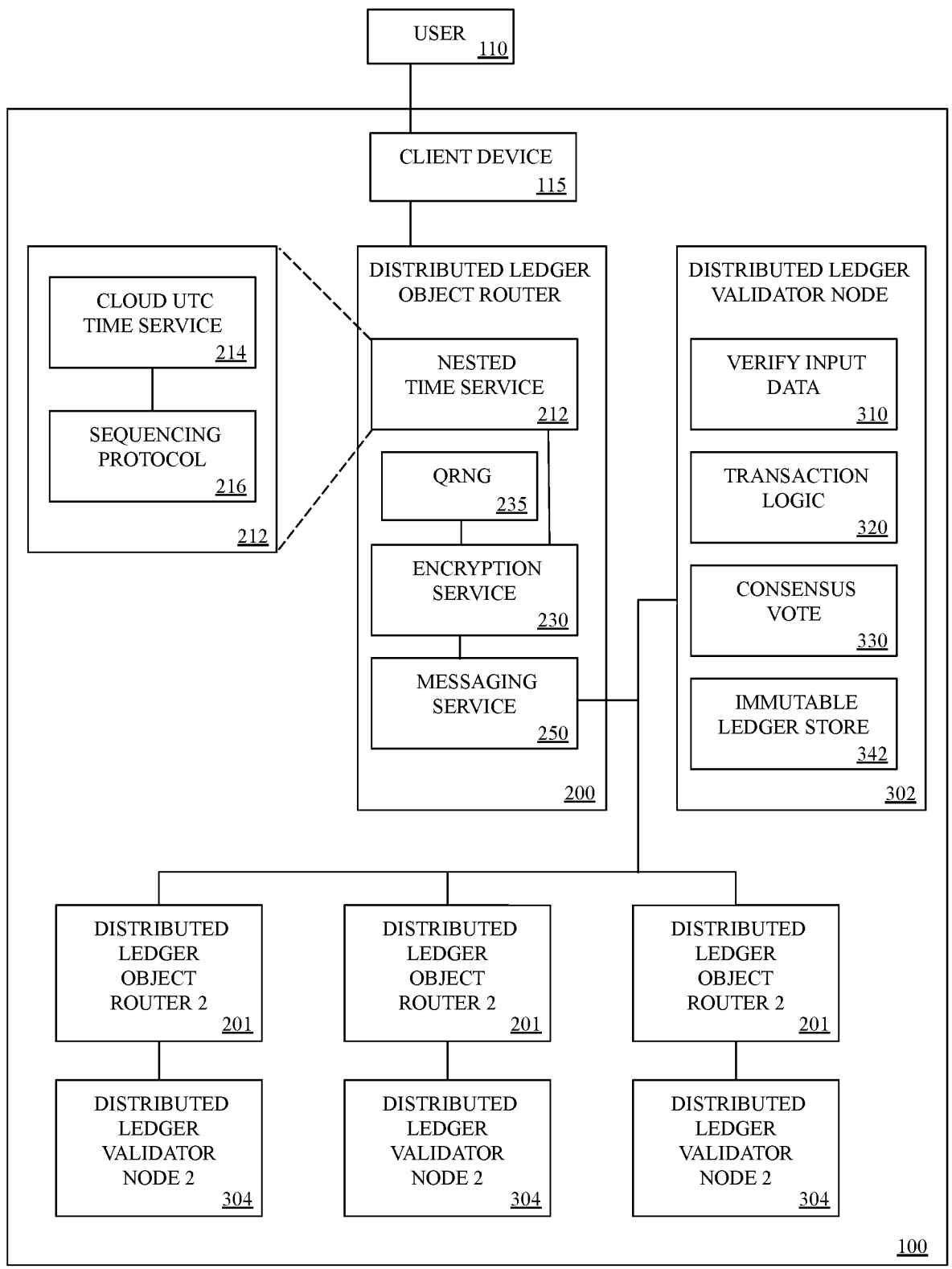
FIG. 5 illustrates the operation of the distributed ledger object router and its associated distributed ledger node using nested time signal devices and methods for the purpose of increasing the total number of time sequenced transactions that may occur within a specified time period.

With reference now to FIG. 5 of the Drawings, there is illustrated therein an embodiment of the present invention, which operates within a distributed communications network generally designated by the reference numeral 100. Embodiments of distributed communications network 100 include the distributed networks shown in FIGS. 1-4 as well as the embodiment shown in FIG. 5.

A user 110 of the network 100 uses any of a variety of client devices, including a desktop, laptop, tablet, smartphone, or any other personal computing wireline or wireless computing device or, alternatively, a server computer located on-site, in a data center, in a 5G edge cloud or other private or public cloud, generally designated by the reference number 115, that has as part of its function the ability to initiate and/or participate in multi-party transactions over the network. As shown in FIG. 5, the user 110 uses said client device 115 to initiate a transaction with the distributed ledger object router 200 over the network 100. In the present example, the distributed ledger object router 200 communicates directly with at least one or more distributed ledger validator nodes 302 on the network 100. A distributed ledger validator node 302 is distinct from other types of distributed ledger nodes in that it is the only type of node able to participate in consensus voting. A distributed ledger validator node 302 is responsible for verifying, voting on and maintaining an immutable record of all transactions validated by the distributed ledger. This requires that all distributed ledger object routers 200, 201 and distributed ledger validator nodes 302, 304 in the network 100 must use the same type of device or devices and method or methods to process transactions.

While it would be desirable to use a network time service providing a time tick of 100 nanoseconds or less, preferably 10 nanoseconds or less, because having a finely granular time signal allows timestamps to be applied to each incoming transaction to time order received transactions, such network time signals are not commonly available. Therefore, the likelihood of a duplicate timestamp between two or more transactions becomes more and more likely, with resulting risk of transaction collisions and race conditions, which are often difficult to identify and resolve.

Infrastructure-as-a-Service cloud vendors often provide uniform decentralized network time services accurate to milliseconds or microseconds across the vendor's entire cloud infrastructure. This allows servers anywhere in the network to access a time service that is accurate to a specific time measurement and duration, one millisecond (ms) for example.

Global cloud vendors traditionally isolate computing resources in data centers. Multiple data centers in turn are geographically organized into zones. Zones in turn are organized into regions. Allowing computing resources to be distributed geographically across data centers, zones and regions increases isolation, redundancy and the overall security of each object router 200, 201 and validator node 302, 304 in the network 100.

The goal of the present invention is to obtain a timestamp and time ordering accuracy comparable to the time ordering accuracy that would be available from a network time service providing a time tick of 100 nanoseconds or less, preferably 10 nanoseconds or less. In this way, the possibility of a duplicate timestamp on two or more transactions is eliminated, eliminating the risk of collisions and race conditions. The timestamp is preferably appended to header information associated with the transaction, preferably with an identifier, but may be applied to the transaction in other known ways as well.

As example and not by way of limitation, a one millisecond UTC time service such as those provided by cloud vendors can be used to demonstrate the nested time signal method and apparatus of the present invention.

The distributed ledger object router's 200 nested time service 212 first timestamps a new, incoming transaction using the cloud's UTC time service 214 which provides a Coordinated Universal Time or UTC time stamp with a fixed, predetermined time measurement. In a typical embodiment, the Coordinated Universal Time or UTC time stamp is accurate to 1 ms. This is the first step in a process that creates an ordered set of transactions that describe the order in which new, incoming transactions were received by a given node. Following the attachment of the UTC timestamp to the transaction, a predefined number of additional new, incoming transactions can be sequentially connected to the timestamped transaction through the use of cryptographic hashes.

The following table describes the use of timestamps and cryptographic hashes to timestamp and sequentially order three consecutive transactions received by a single node:

| Object Router | |
|---|---|
| Data Record | D1 |
| Timestamp (ms) | T1 |
| Hash | H1(T1 + D1) |
| Data Record | D2 |
| Hash | H2(D2) |
| Hash | H3(H1 + H2) |
| Data Record | D3 |
| Hash | H4(D3) |
| Hash | H5(H3 + H4) |

Referencing both FIG. 5 and the above table, following the distributed ledger object router's 200 receipt of a new, incoming data record (D1), a nested time service 212 timestamps the transaction using the cloud's UTC time service 214 which provides a Coordinated Universal Time or UTC timestamp (T1) with a fixed, predetermined time measurement (in this case, 1 ms). The sequencing protocol 216 then creates a cryptographic hash (H1) from the concatenated timestamp (T1) and data record (D1). The next data record is processed by first creating a cryptographic hash (H2) from the data record (D2) using the sequencing protocol 216 and creating another cryptographic hash (H3) from the concatenation of the previous transaction's cryptographic hash (H1) and the current transaction's first cryptographic hash (H2), again using the sequencing protocol 216. This cryptographically and sequentially links the second transaction's data record (D2) to the first transaction's data record (D1) and timestamp (T1). To continue the example, a third data record (D3) is sequentially linked to the second data record (D2) by first creating a cryptographic hash (H4) from the third data record (D3) using the sequencing protocol 216 and creating another cryptographic hash (H5) from the concatenation of the previous transaction's second cryptographic hash (H3) and the current transaction's first cryptographic hash (H4), again using the sequencing protocol 216. The result is a cryptographically linked series of transactions that derive their time order from the timestamp (T1) associated with the ordered set of values {(D1, T1, H1), (D2, H2, H3), (D3, H4, H5)}.

Although the foregoing example provides an example of three transactions, it is to be appreciated that the method of the invention can be applied to any number of transactions received in a time period associated with the timestamp (T1), and that the description and claims are not limited to only three transactions. The only limitation is the ability of a node to execute n transactions in a given time period.

In most embodiments, the same hashing function will be used at each hash generation step to create e.g. (H1), (H2), (H3), (H4), (H5), . . . etc. Thus the first hashing algorithm, the second hashing algorithm, the third hashing algorithm, the fourth hashing algorithm, and the fifth hashing algorithm, etc. will be the same hashing algorithm, however, having different inputs.

The hashing function used in the present invention is desirably the simplest, fastest hash available. Therefore SHA-2 is a desirable choice for the hashing function. However, other hashing functions may be used, such as SHA-3, SHA-12, and also SHA-256, and other Merkle Trie data structures and/or quantum-safe cryptographic hash functions approved by the National Institute of Standards and Technology (NIST) for use in quantum-safe cryptographic algorithms.

The same process can be applied to the processing of any number of distributed ledger object routers 200, 201 and their corresponding distributed ledger validator nodes 302, 304.

The following table shows the use of round-robin transaction processing, normally a form of load balancing, among three distinct object routers 200, 201 and their corresponding distributed ledger validator nodes 302, 304:

| Object Routers | OR 1 | OR 2 | OR 3 |
|---|---|---|---|
| Data Record | D1 | D4 | D7 |
| Timestamp (ms) | T1 | T2 | T3 |
| Hash | H1(T1 + D1) | H6(T2 + D4) | H11(T3 + D7) |
| Tx Record | D2 | D5 | D8 |
| Hash | H2(D2) | H7(D5) | H12(D5) |
| Hash | H3(H1 + H2) | H8(H6 + H7) | H13(H11 + H12) |
| Tx Record | D3 | D6 | D9 |
| Hash | H4(D3) | H9(D6) | H14(D9) |
| Hash | H5(H3 + H4) | H10(H8 + H9) | H15(H13 + H14) |

The resulting cryptographically linked series of transactions that derive their time order from this process is described by the ordered set of values:

{(D1, T1, H1), (D2, H2, H3), (D3, H4, H5), (D4, T2, H6), (D5, H7, H8), (D6, H9, H10), (D7, T3, H11), (D8, H12, H13), (D9, H14, H15)}.

Another example showing the use of random selection without replacement of object routers 200, 201 and their corresponding distributed ledger validator nodes 302, 304 is contained in the following table:

| Object Routers | OR 2 | OR 1 | OR 3 |
|---|---|---|---|
| Data Record | D1 | D4 | D7 |
| Timestamp (ms) | T1 | T2 | T3 |
| Hash | H1(T1 + D1) | H6(T2 + D4) | H11(T3 + D7) |
| Tx Record | D2 | D5 | D8 |
| Hash | H2(D2) | H7(D5) | H12(D8) |
| Hash | H3(H1 + H2) | H8(H6 + H7) | H13(H11 + H12) |
| Tx Record | D3 | D6 | D9 |
| Hash | H4(D3) | H9(D6) | H14(D9) |
| Hash | H5(H3 + H4) | H10(H8 + H9) | H15(H13 + H14) |

The resulting cryptographically linked series of transactions that derive their time order from this process is the same as that described in the previous example:

{(D1, T1, H1), (D2, H2, H3), (D3, H4, H5), (D4, T2, H6), (D5, H7, H8), (D6, H9, H10), (D7, T3, H11), (D8, H12, H13), (D9, H14, H15)}.

Although the foregoing example provides an example of nine transactions, it is to be appreciated that the method of the invention can be applied to any number of transactions received in a time period associated with the timestamp (T1), and that the description and claims are not limited to only nine transactions. The only limitation is the ability of a node or nodes to execute n transactions in a given time period.

The same or similar process can be applied to other methods of time ordering sets of transactions within and between any number of distributed ledger object routers 200, 201 and their corresponding distributed ledger validator nodes 302, 304.

The foregoing example provides a transaction ordering procedure, based on the hash, for transactions received within the 1 millisecond time period of timestamp (T1). With the next time tick of network time, transactions received in the new 1 millisecond time period are identified with a new timestamp (T2) and the sequencing protocol 216 operates as previously described, using (T2) as the new time input. The protocol 216 creates a cryptographic hash ($H_n$)

from the concatenated timestamp (T2) and data record ($D_n$). The next data record is processed by creating a cryptographic hash ($H_{n+1}$) from the data record ($D_{n+1}$) and another cryptographic hash ($H_{n+2}$) from the concatenation of the previous transaction's cryptographic hash ($H_{n+1}$).

Following the addition of a timestamp or cryptographic hash identifier to each transaction, the transaction is encrypted by an encryption service 230. Desirably, encryption service 230 uses, as part of its operation, a physical quantum random number generator or QRNG 235 to create public encryption keys, private encryption keys, nonces and one time key pads in any combination that meet the entropy and other security requirements defined by standards that include, but are not limited to, AIS31 PTG.3. Following the encryption of the transaction data, a messaging service 250 communicates the transaction data to its associated distributed ledger validator node 302 and to other distributed ledger object routers 201 on the network 100 through a validator messaging service 202. The validator messaging service 202 uses a messaging protocol that communicates directly and independently with the other distributed ledger validator nodes 302 in the distributed ledger network 100. As part of their transaction processing workflow, each distributed ledger validator node 302 receiving the transaction processes the transaction as follows: It first verifies the input data 310. If the verification is successful, the node executes the transaction logic 320 associated with the transaction. Following the execution of the transaction logic, the distributed ledger validator node 300 votes to either confirm or deny the transaction 330. If the verification of the input data 310 or the execution of the transaction logic 320 does not meet the requirements for a successful vote, the vote result is "NO". Otherwise, the vote result is "YES". The vote result is transmitted to that distributed ledger validator node's 302 object router 200 where it is communicated via the validator messaging service 202 to the other distributed ledger validator nodes 304 in the network. Once the number of "YES" votes reaches the consensus majority vote threshold (ex. 51% or higher) for approval of the transaction, the transaction is added to each distributed ledger validator node's immutable ledger store 342 as part of the immutable record of all transactions maintained separately by all distributed ledger validator nodes 302, 304 in the network.

What is claimed is:

1. A decentralized computing system for processing distributed ledger transactions comprising:
   a distributed ledger object router having a timestamp module, an encryption module, one or more hashing modules, and a communication module;
   the timestamp module operating to generate timestamp data identifying when transaction data is received by the distributed ledger transaction module;
   the hashing modules operating to hash transaction data, timestamp data, and/or hash values;
   one or more client devices having a distributed ledger transaction module to receive input data and generate transaction data, which is in electronic communication with the distributed ledger object router;
   a distributed ledger validator node associated with the distributed ledger object router;
   a persistent, immutable data store;
   wherein when one of the one or more client devices receives input data and initiates a transaction and generates transaction data (D1), the timestamp module generates timestamp data (T1) derived from a network time signal, and the one or more hashing modules apply a first hashing algorithm to the timestamp data (T1) and the transaction data (D1) to create a hash value (H1);
   wherein the distributed ledger object router associates the hash value (H1) with the transaction data (D1);
   wherein when one of the one or more client devices receives input data and initiates a second transaction and generates transaction data (D2), the one or more hashing modules apply a second hashing algorithm to the transaction data (D2) to create a hash value (H2) and apply a third hashing algorithm to the hash value (H1) and the hash value (H2) to create a hash value (H3);
   wherein the distributed ledger object router associates the hash value (H3) with the transaction data (D2);
   wherein the distributed ledger object router transmits the transaction data (D1) and (D2), and associated hash values (H1) and (H3), to the distributed ledger validator node;
   wherein the distributed ledger validator node processes the transaction data (D1) and (D2) and orders them in a first-in-first-out sequence determined from the hash values (H1) and (H3).

2. The decentralized computing system of claim 1:
   wherein when one of the one or more client devices receives input data and initiates a third transaction and generates transaction data (D3), the one or more hashing modules apply a fourth hashing algorithm to the transaction data (D3) to create a hash value (H4) and apply a fifth hashing algorithm to the hash value (H3) and the hash value (H4) to create a hash value (H5);
   wherein the distributed ledger object router associates the hash value (H5) with the transaction data (D3);
   wherein the distributed ledger object router transmits the transaction data (D3) and associated hash value (H5) to the distributed ledger validator node;
   wherein the distributed ledger validator node processes the transaction data (D3) and orders the transaction data (D1), D(2) and (D3) in a first-in-first-out sequence determined from the hash values (H1), (H3), and (H5).

3. The decentralized computing system of claim 1:
   wherein the distributed ledger validator node receives the encrypted transaction data and associated hash values and unencrypts the transaction data and hash values;
   wherein the distributed ledger validator node determines the validity of the transaction data;
   wherein the distributed ledger validator node determination of the validity of the transaction data is transmitted to the distributed ledger object router and to other distributed ledger validator nodes;
   wherein if the distributed ledger validator nodes obtain a consensus majority threshold to validate the transaction data, the transaction data is added to the immutable persistent ledger data store;
   wherein the distributed ledger validator node processes the transaction data independently using a first-in-first-out sequence based upon the hash values.

4. The decentralized computing system of claim 2:
   wherein the distributed ledger validator node receives the encrypted transaction data (D1), (D2), and (D3) and associated hash values (H1), (H2), (H3), (H4), and (H5);
   wherein the distributed ledger validator node unencrypts the encrypted transaction data (D1), (D2), and (D3) and any associated hash values (H1), (H2), (H3), (H4), and (H5);
   wherein the distributed ledger validator node determines the validity of the transaction data (D1), (D2), (D3);

wherein the distributed ledger validator node determination of the validity of the transaction data (D1), (D2), (D3) is transmitted to the distributed ledger object router and to other distributed ledger validator nodes;

wherein if the distributed ledger validator nodes obtain a consensus majority threshold to validate the transaction data (D1), (D2), and/or (D3), the transaction data (D1), (D2), and/or (D3) is added to the immutable persistent ledger data store;

wherein the distributed ledger validator node processes the transaction data independently using a first-in-first-out sequence based upon one or more of the hash values (H1), (H2), (H3), (H4), and (H5).

5. A method for processing distributed ledger transactions comprising the steps of:

initiating a distributed ledger transaction using a client device in electronic communication with a distributed ledger object router by entering input data to generate transaction data (D1);

generating timestamp data (T1) for the transaction, the timestamp data (T1) identifying a time when the transaction data was acquired, said timestamp data (T1) being derived from a network time signal;

applying a first hashing algorithm to the timestamp data (T1) and the transaction data (D1) to create a hash value (H1);

associating the hash value (H1) with the transaction data (D1);

initiating a second distributed ledger transaction using the client device or another client device in electronic communication with the distributed ledger object router by entering input data to generate transaction data (D2);

applying a second hashing algorithm to the transaction data (D2) to create a hash value (H2);

applying a third hashing algorithm to the hash value (H1) and the hash value (H2) to create a hash value (H3);

associating the hash value (H3) with the transaction data (D2);

initiating a third distributed ledger transaction using the client device or another client device in electronic communication with the distributed ledger object router by entering input data to generate transaction data (D3);

applying a fourth hashing algorithm to the transaction data (D3) to create a hash value (H4);

applying a fifth hashing algorithm to the hash value (H3) and the hash value (H4) to create a hash value (H5);

associating the hash value (H5) with the transaction data (D3);

encrypting the transaction data (D1), (D2), and (D3) and the associated hash values (H1), (H3), and (H5);

transmitting the encrypted transaction data (D1), (D2), and (D3) and associated hash values (H1), (H3), and (H5) to a distributed ledger validator node;

the distributed ledger validator node unencrypting received encrypted transaction data (D1), (D2), and (D3) and any associated hash values (H1), (H3), and (H5);

the distributed ledger validator node processing the unencrypted transaction data (D1), (D2), and (D3) and ordering them in a first-in-first-out sequence determined from the hash values (H1), (H3), and (H5);

the distributed ledger validator node determining the validity of the transaction data (D1), (D2), (D3);

the distributed ledger validator node transmitting the distributed ledger validator node determination the first-in-first-out sequence and the validity of the transaction data (D1), (D2), (D3) to the distributed ledger object router and to other distributed ledger validator nodes;

if the distributed ledger validator nodes obtain a consensus majority threshold to validate the transaction data (D1), (D2), and/or (D3) adding the validated transaction data to an immutable persistent ledger data store.

6. The method of claim 5, further comprising:

initiating a fourth distributed ledger transaction using the client device or another client device in electronic communication with another distributed ledger object router by entering input data to generate transaction data (D4);

generating timestamp data (T2) for the transaction, the timestamp data (T2) identifying a time when the transaction data was acquired, said timestamp data (T2) being derived from a network time signal;

applying a sixth hashing algorithm to the transaction data (D4) and the timestamp data (T2) to create a hash value (H6);

associating the hash value (H6) with the transaction data (D4);

encrypting the transaction data (D4) and the associated hash value (H6);

transmitting the encrypted transaction data (D4) and the associated hash value (H6) to the distributed ledger validator node;

the distributed ledger validator node unencrypting received encrypted transaction data (D4) and associated hash value (H6);

the distributed ledger validator node processing the unencrypted transaction data (D4), and ordering it in a first-in-first-out sequence relative to (D1), (D2), and (D3).

7. The method of claim 6, further comprising:

initiating a fifth distributed ledger transaction using the client device or another client device in electronic communication with the another distributed ledger object router by entering input data to generate transaction data (D5);

applying a seventh hashing algorithm to the transaction data (D5) to create a hash value (H7);

applying an eighth hashing algorithm to the hash value (H6) and the hash value (H7) to create a hash value (H8);

associating the hash value (H8) with the transaction data (D5)

encrypting the transaction data (D5) and the associated hash value (H8);

transmitting the encrypted transaction data (D5) and the associated hash value (H8) to the distributed ledger validator node;

the distributed ledger validator node unencrypting received encrypted transaction data (D5) and associated hash value (H8);

the distributed ledger validator node processing the unencrypted transaction data (D5), and ordering it in a first-in-first-out sequence relative to (D4) determined from the hash values (H6) and (H8).

8. A method for processing distributed ledger transactions comprising the steps of:

initiating a distributed ledger transaction using a client device in electronic communication with a distributed ledger object router by entering input data to generate transaction data (D1);

generating timestamp data (T1) for the transaction, the timestamp data (T1) identifying a time when the transaction data was acquired, said timestamp data (T1) being derived from a network time signal;
applying a first hashing algorithm to the timestamp data (T1) and the transaction data (D1) to create a hash value (H1);
associating the hash value (H1) with the transaction data (D1);
initiating a second distributed ledger transaction using the client device or another client device in electronic communication with the distributed ledger object router by entering input data to generate transaction data (D2);
applying a second hashing algorithm to the transaction data (D2) to create a hash value (H2);
applying a third hashing algorithm to the hash value (H1) and the hash value (H2) to create a hash value (H3);
associating the hash value (H3) with the transaction data (D2);
initiating a third distributed ledger transaction using the client device or another client device in electronic communication with the distributed ledger object router by entering input data to generate transaction data (D3);
applying a fourth hashing algorithm to the transaction data (D3) to create a hash value (H4);
applying a fifth hashing algorithm to the hash value (H3) and the hash value (H4) to create a hash value (H5);
associating the hash value (H5) with the transaction data (D3);
transmitting the transaction data (D1), (D2), and (D3) and associated hash values (H1), (H3), and (H5) to a distributed ledger validator node;
the distributed ledger validator node processing the transaction data (D1), (D2), and (D3) and ordering them in a first-in-first-out sequence determined from the hash values (H1), (H3), and (H5).

9. The method of claim 8, further comprising:
initiating a fourth distributed ledger transaction using the client device or another client device in electronic communication with another distributed ledger object router by entering input data to generate transaction data (D4);
generating timestamp data (T2) for the transaction, the timestamp data (T2) identifying a time when the transaction data was acquired, said timestamp data (T2) being derived from a network time signal;
applying a fifth hashing algorithm to the transaction data (D4) and the timestamp data (T2) to create a hash value (H6);
associating the hash value (H6) with the transaction data (D4);
transmitting the transaction data (D4) and the associated hash value (H6) to the distributed ledger validator node;
the distributed ledger validator node processing the transaction data (D4), and ordering it in a first-in-first-out sequence relative to (D1), (D2), and (D3).

10. The method of claim 9, further comprising:
initiating a fifth distributed ledger transaction using the client device or another client device in electronic communication with the another distributed ledger object router by entering input data to generate transaction data (D5);
applying a seventh hashing algorithm to the transaction data (D5) to create a hash value (H7);
applying an eighth hashing algorithm to the hash value (H6) and the hash value (H7) to create a hash value (H8);
associating the hash value (H8) with the transaction data (D5)
transmitting the transaction data (D5) and the associated hash value (H8) to the distributed ledger validator node;
the distributed ledger validator node processing the transaction data (D5), and ordering it in a first-in-first-out sequence relative to (D4) determined from the hash values (H6) and (H8).

* * * * *